June 6, 1944.    H. W. ADAMS ET AL    2,350,662
HYDRAULIC SYSTEM AND CONTROL
Filed Feb. 26, 1940    3 Sheets-Sheet 2
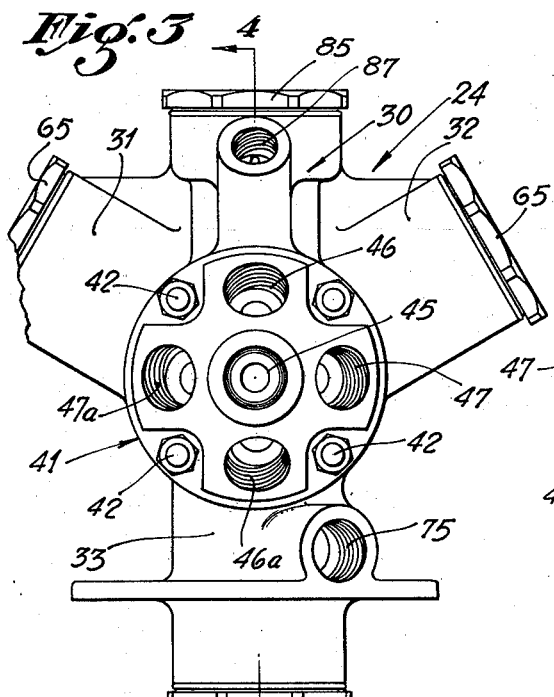
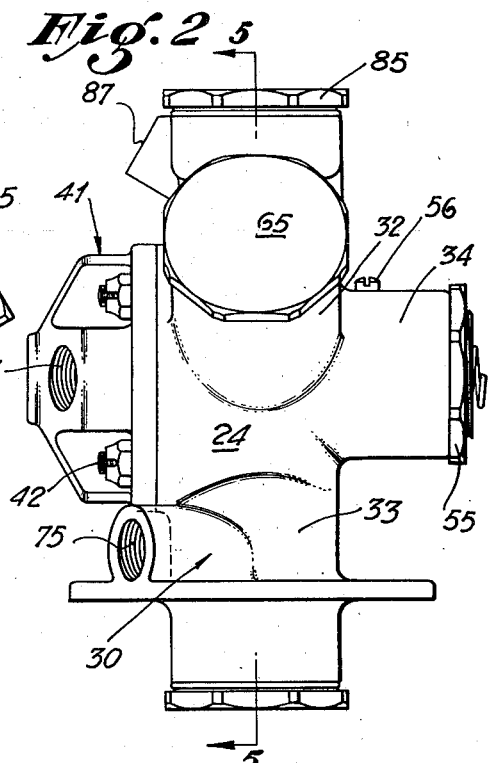
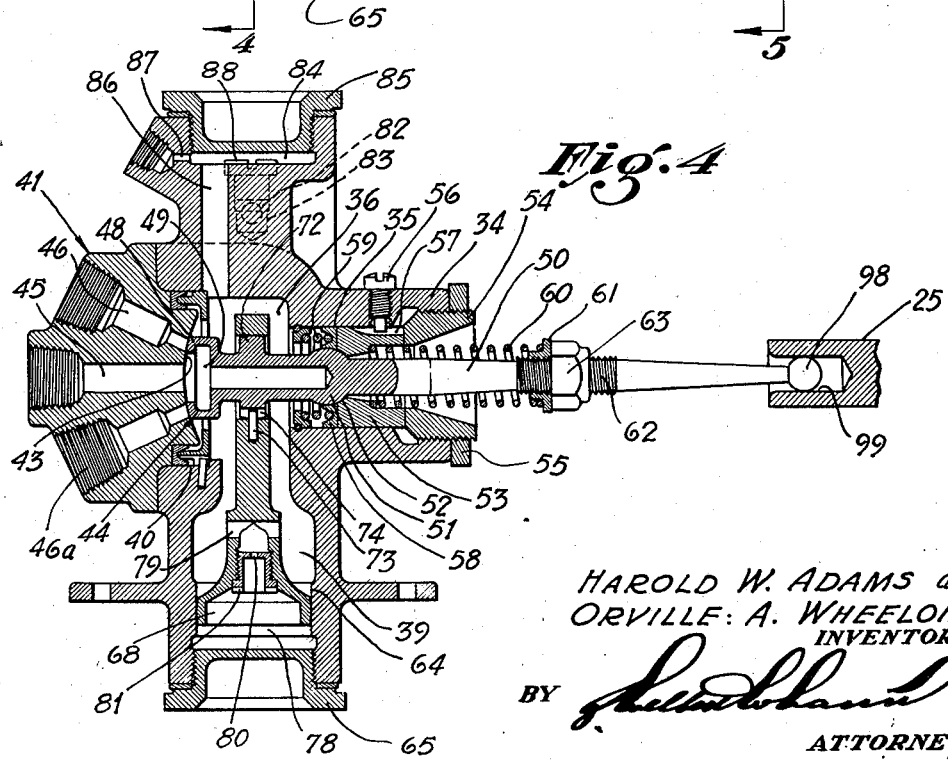
HAROLD W. ADAMS and
ORVILLE A. WHEELON,
INVENTORS;
BY
ATTORNEY.

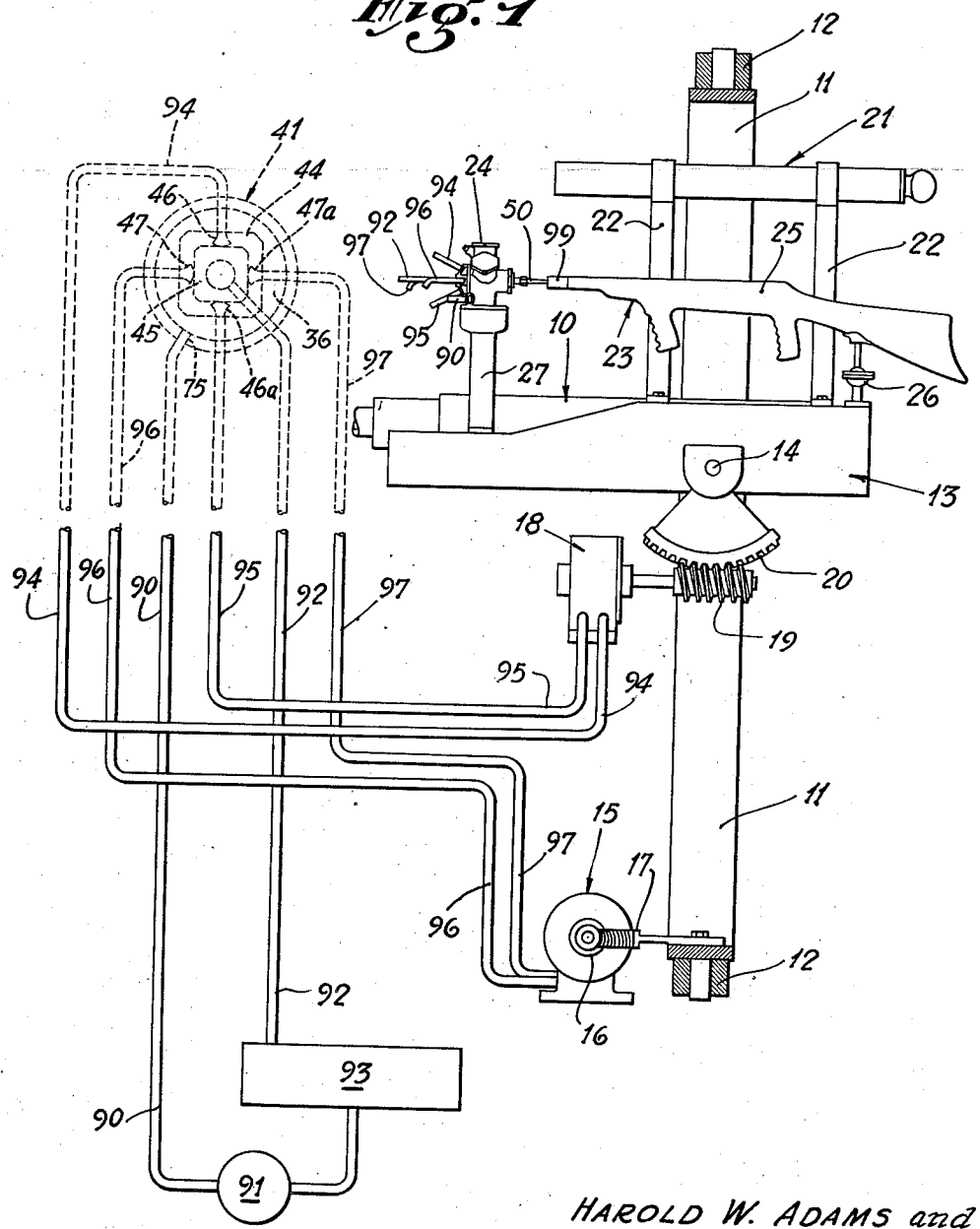

June 6, 1944. H. W. ADAMS ET AL 2,350,662
HYDRAULIC SYSTEM AND CONTROL
Filed Feb. 26, 1940 3 Sheets-Sheet 3
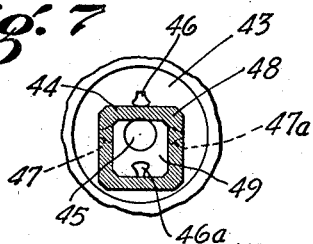
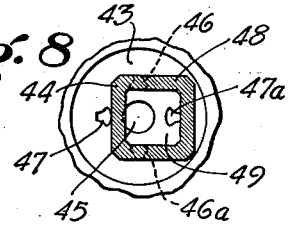
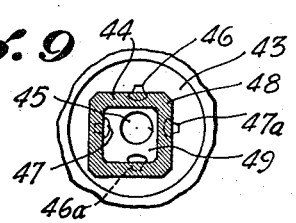
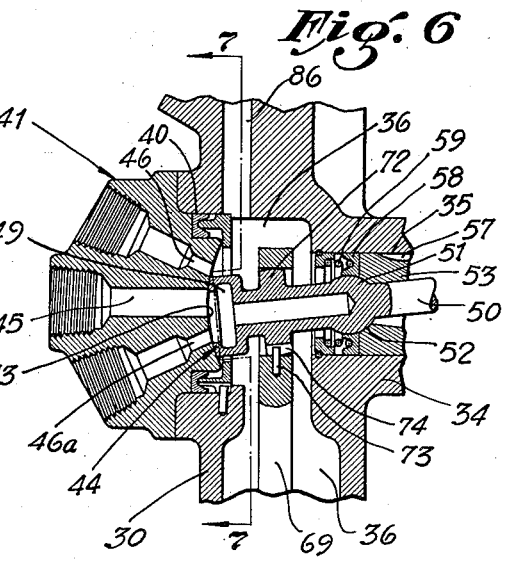
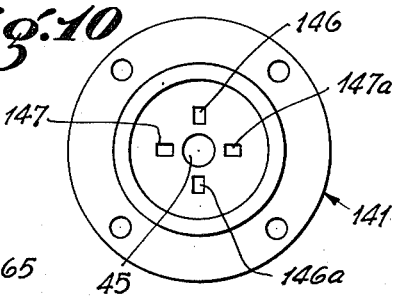
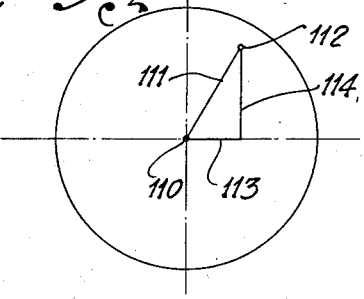
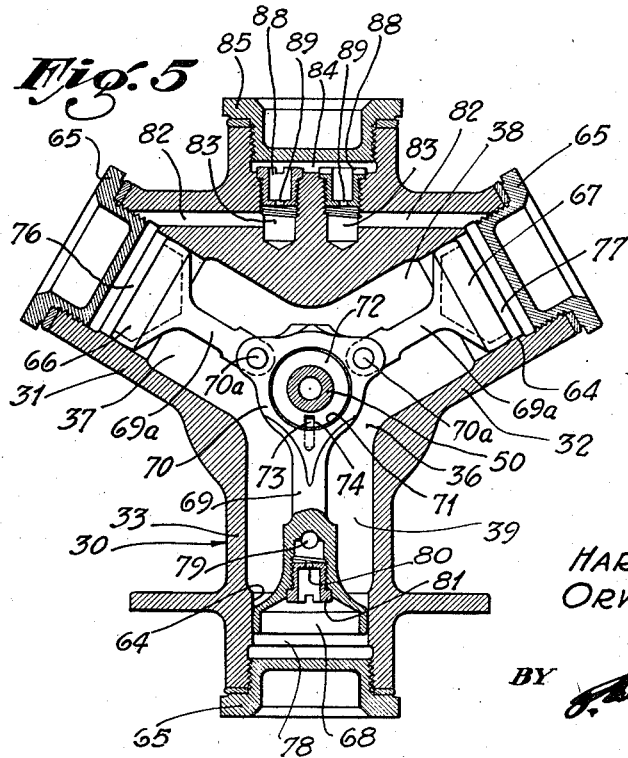
HAROLD W. ADAMS and
ORVILLE A. WHEELON,
INVENTORS;
BY
ATTORNEY.

Patented June 6, 1944

2,350,662

UNITED STATES PATENT OFFICE

2,350,662

HYDRAULIC SYSTEM AND CONTROL

Harold W. Adams, Santa Monica, and Orville A. Wheelon, Pacific Palisades, Calif., assignors to Douglas Aircraft Company, Inc., Santa Monica, Calif., a corporation of Delaware Application February 26, 1940, Serial No. 320,842

17 Claims. (Cl. 89—41)

The present invention relates to a simple system and control for application of power to a universally movable member and relates in particular to means for pointing guns by use of fluid under pressure.

Although the invention may be used for control and application of hydraulic power or pressure to produce movement of many types of members which in their use require universal movement or adjustment, its greatest utility is at present believed to be in the aiming of guns carried by swivel supports so as to have universal movement within a given angular range. Accordingly, we have in the present application, for illustration of the general nature of the invention, shown it in conjunction with a power driven gun mount such as used on aircraft.

It is an object of the invention to provide a simple fluid pressure system associated with fluid motors whereby the fluid pressure may be employed to produce movement of a member in a number of different directions from a central position, a control member mounted so that it may be moved in the direction in which it is desired to move the power driven member, and a simple valve means connected to the control member so as to be actuated in accordance with the movement of the control member and which valve means will control the application of fluid under pressure to the motors in such manner as to produce a movement of the power driven member in the direction in which the control member has been moved or displaced from a centralized position.

It is an object of the invention to provide a fluid pressure system of the above character which will be sensitive in its action and will respond quickly and smoothly to the movement of the control member. The invention, accordingly, is of particular value in conjunction with universally mounted guns, especially where the use of such guns involves the firing upon the targets or objects moving at relatively high speed. For example, in combat between aircraft and also in the firing upon aircraft from a ground position, the relative movement of the target and the gun emplacement is often at comparatively high speed, and if the fire directed at the target is to be effective the power device for moving the gun must respond substantially instantaneously to the actuation of the control member by the gunner.

It is an object of the invention to provide a power system for use under conditions, such as set forth in the foregoing, having a control which operates substantially without lag and produces a smooth and proportionate change in the degree or intensity of the power applied so that a smooth movement of the gun is accomplished and an effective aiming of the gun upon a moving target is attained. The importance of our new controlling means will be perceived from the following. Hydraulic power systems for universal movement of guns have been made having motors controlled by hand operated valves of the plunger or slide type. Such valves were found to have such lag in their action, due in many instances to the pressure required to move the valve parts, that a jerky movement of the gun resulted. For example, it was found that in attempting to cause the gun to follow a target moving in a transverse direction, the gun would first lag behind the target and then actuation of the control valve in a direction to produce movement of the gun to follow the target would cause the gun to move toward the target and then pass beyond the position of the target before a change in the operation of the control valve could be made to cause the speed of the gun movement to correspond to the speed of the target. To overcome the difficulty set forth in the foregoing and to accomplish other valuable results, as will be herein set forth, we have as a part of our present hydraulic system provided a simple control valve having a single universally movable valve part operative to control the application of fluid under pressure to a pair of reversible hydraulic motors mounted so as to produce a movement of the gun mount relative to crossing axes.

It is a further object of the invention to provide a valve of the character set forth in the foregoing paragraph having a universally swingable valve member of novel form mounted so that pressure applied thereto will be substantially balanced, with the result that the valve member may be moved in any of its directions of movement by the same application of pressure. For example, valves known to us for this use have required a pressure of about two pounds against the control member to produce initial movement of the valve element from one position to another, thereby resulting in a jerky movement of such valve member due first to the lag in the start of the movement of the valve element while the pressure is being applied and then to the movement of the valve element beyond its intended stopping position due to the application of this pressure required to produce the initial movement.

It is an object of the invention to provide a control valve having a spherical wall with fluid ports extending through this spherical wall, and a movable valve member supported so that it will have universal movement on the point around which the spherical surface of the wall is generated, and having a spherical face to engage the spherical surface of the wall, there being means for producing universal movement of the valve member so that the ports will be closed and opened in such a manner and to such a degree that controlled flows of fluid under pressure will be delivered to the associated fluid driven motors to drive them at such relative velocity that the movement of the gun from an initial position will follow the direction in which the control member has been moved.

Further objects and advantages of the invention will be brought out in the following part of the specification.

Referring to the drawings which are for illustrative purposes only:

Fig. 1 is a diagrammatic view showing our simple hydraulic system as applied to the power movement of a universally mounted gun, this view having a diagrammatic representation of the valve ports and valve closure drawn to enlarged scale.

Fig. 2 is a side view of the body of the control valve forming a part of our invention.

Fig. 3 is a face view of the valve.

Fig. 4 is a cross-sectional view taken on a plane represented by the line 4—4 of Fig. 3.

Fig. 5 is a sectional view taken on the plane indicated by the line 5—5 of Fig. 2.

Fig. 6 is a fragmentary sectional view of the central portion of Fig. 4, with the movable valve closure member displaced downward.

Fig. 7 is a diagrammatic view showing the closure member in downwardly displaced position relative to the ports of the valve plate, to correspond to the position thereof in Fig. 6.

Fig. 8 is a diagrammatic view similar to Fig. 7 showing the closure member in laterally displaced position.

Fig. 9 is another diagrammatic view similar to Fig. 7 showing the closure member in a diagonally offset position.

Fig. 10 is a face view of a stationary valve plate which may be employed in the valve structure in a hydraulic system having means to automatically compensate for pressure drop.

Fig. 11 is a diagram illustrating conditions of control attained in the use of our present invention.

To illustrate the general utility of the invention, Fig. 1 schematically shows a gun 10 mounted for universal swinging movement by means of a gimbal ring construction comprising a yoke or frame 11, supported so as to rotate on a vertical axis by means of bearings 12, and a gun support or cradle 13 supported in the yoke 11 so as to swing on the horizontal axis defined by a lateral shaft 14. Lateral swinging movement of the gun 10 around the vertical axis is obtained by use of a reversible fluid motor 15 having a worm 16 which engages a worm gear segment 17 secured to the lower part of the yoke 11. Vertical swinging movement of the gun 10 around the horizontal axis is obtained by use of a reversible fluid motor 18 which drives a worm 19 engaging a worm gear segment 20 which is secured to the gun support or cradle 13.

Since various types of gun sights may be employed with the gun 10, we have merely shown a telescopic sight 21 positioned above the gun and being connected thereto by means of brackets 22. For control of movement of the gun 10 through operation of the hydraulic motors 15 and 18, we have shown a form of our simple controlling device 23 comprising a novel four-way duplex valve 24 and a movable control member 25 for such valve consisting preferably of a rifle stock connected to the rear end of the gun support 13 by means of a universal joint 26 so that the forward end of the member 25 may be swung in the direction in which it is desired to move the gun 10 in the pointing or aiming of the gun.

The valve 24 may be mounted on the forward part of the gun support 13 by means of a bracket 27, and this valve 24 is connected with a source of hydraulic fluid under pressure and with the motors 15 and 18 by a conduit system which will be hereinafter described in detail.

The duplex four-way valve is shown in detail in Figs. 2 to 6 inclusive. It includes a body 30 of hollow construction having a central chamber and a plurality of radiating arms, preferably three in number and identified as 31, 32, and 33, and being directed outward in a common plane at angles of 120°, with the arms 31 and 32 extending upwardly and outwardly and the arm 33 extending downwardly. As shown in Figs. 2 and 4, the body 30 has a central, rearwardly extending hub 34 with a bore 35 on an axis perpendicular to the plane defined by the arms 31, 32, and 33. The body 30 has a chamber 36 which communicates with the inner end of the bore 35 and has adiating portions 37, 38, and 39 extending outward through the arms 31, 32, and 33. In the front or leftward wall of the body 30 there is a bore or opening 40 coaxial with the bore 35, and a ported body 41 is secured by means of stud bolts 42 in a position to close the opening 40.

The ported body 41 has an inwardly faced concave spheroidal surface 43 against which a hollow, square valve plate or closure member 44 is fitted, and a fluid return port 45 extends substantially centrally through the body 41 so as to meet the center of the spheroidal face 43. In the ported body 41, service ports 46, 46a, 47, and 47a are arranged around the return port 45 in the manner shown in Figs. 7, 8, and 9, the ports 46, and 46a being respectively above and below the port 45, and the ports 47 and 47a being on opposite sides of the port 45.

The closure member 44 is of quadrilateral cross-section as shown in Figs. 7 to 9, and has a quadrilateral lip 48 disposed around a central cavity or opening 49 which is continuously in communication with the return port 45 and has for its purpose to connect this return port 45 with selected service ports as shown in Figs. 7 to 9 inclusive, when the closure member 44 is moved from its centralized position shown in Fig. 4. The lip 48 of the closure member 44 is of such width that when the closure member is in centralized position as shown in Figs. 1 and 4, the lip 48 will close all of the service ports 46, 46a, 47, and 47a.

The closure member 44 is on the inner or leftward end of a universally swingable lever 50 which projects through the bore 35 and has thereon a spherical enlargement 51 to engage a spheroidal seat 52 formed at the inner end of a sleeve 53 which is adjustably held within the bore 35 by means of a threaded adjusting sleeve 54 which is secured in adjusted position by means of a lock nut 55. The sleeve 53 is held from rotation by a dog-pointed screw 56 threaded through the hub 34 so as to engage a slot 57 in the sleeve 53. A double lipped sealing ring 58 is placed in the bore 35 around the ball 51 of the lever 50 and is held in operative position by a spring 59. A balancing spring 60 is placed around the external portion of the lever 50 in such position that its inner end will engage the sleeve 53 and its outer end will engage a ring nut 61, locked in adjusted position on the threaded portion 62 of the lever 50 by means of a lock nut 63. The unbalanced area of the closure member 44 is preferably slightly larger than the area of that portion of the ball 51 in engagement with the spherical seat 52, with the result that the pressure on the lever 50 in axial direction is unbalanced in the direction of the concave spheroidal face 43. The pressure with which the closure member 44 is forced against the surface 43 may be adjusted by changing the compression in the spring 60, which is accomplished by movement of the ring nut 61 on the threaded portion 62 of the lever 50.

Rotation of the closure member 44 around the axis of the lever 50 is limited and to all practical purposes prevented by the following means which also serves to limit the acceleration in the movement of the lever 50. Cylinder bores 64 are formed near the outer ends of the radiating portions 37, 38, and 39 of the chamber 36, and the outer ends of these portions 37, 38, and 39 are closed by threaded plugs 65, as best shown in Fig. 5. Dashpot pistons 66, 67, and 68 are located in the cylinder bores 64. The lower piston 68 is rigidly connected by means of a radial arm 69 with a ring 70 having an opening 71 therein, this opening 71 receiving a spherical collar 72 formed on the lever 50 between the closure member 44 and the ball 51. A pin 73 projects inward from the ring 70 into a longitudinal slot 74 in the periphery of the collar 72 and restrains axial rotation of the lever 50 and the closure member 44 relative to the arm 69. The dashpot pistons 66 and 67 are pivotally connected to the ring 70 by radial arms 69a and pivots 70a. It will be noted that as the closure member 44 is swung from one side to another of its neutral position there will be a very slight rotation of the closure member 44 around its axis owing to the rotation of the arm 69 and the pin 73 about the center of the piston 68.

The chamber 36 of the valve body 30 has an inlet port 75 through which it receives fluid under pressure from a suitable source, and the dashpot chambers 76, 77, and 78, lying adjacent the outer ends of the pistons 66, 67, and 68 respectively, are all connected through restricted passages with the chamber 36. The lower dashpot chamber 78 is directly connected with the chamber 36 through a passage 79 which extends through the lower part of the radial arm 69, this passage 79 having a flow controlling orifice 80 formed in a plug 81 which threads into the lower portion of the passage 79 as shown in Fig. 5. The upper dashpot chambers 76 and 77 are connected to the chamber 36 through passages 82 which extend to the lower parts of threaded recesses 83 connected to a bleed chamber 84 formed in the upper part of the body 30 and being closed by means of a plug 85. This bleed chamber 84 is connected by means of a vertical passage 86 with the chamber 36, as shown in Fig. 4, and the bleed chamber 84 is provided with a passage or port 87 leading to the exterior of the valve body 30, thereby providing an arrangement of passages whereby all accumulations of gas or air may be bled from the upper part of the valve body. Plugs 88, having flow controlling orifices 89, are threaded into the recesses 83 so that a control of fluid to and from the upper dashpot chambers 76 and 77 is obtained.

The manner in which the valve 24 cooperates in a system for pointing a gun or other universally mounted member is shown in schematic Fig. 1 wherein the ported body 41 with its ports 45, 46, 46a, 47, and 47a, and the rectangular closure member 44 are shown to enlarged scale adjacent the position of the valve 24, so that cooperative movement of the parts of the structure shown in Fig. 1 may be readily traced. A pressure fluid delivery conduit 90 connects the inlet 75 of the chamber 36 with a suitable source represented as a pump 91, and a return conduit 92 connects with the return passage 45 so that the discharged hydraulic fluid may be carried to a reservoir 93. The ports 46 and 46a are respectively connected through conduits 94 and 95 with the motor 18, and the ports 47 and 47a are connected respectively through conduits 96 and 97 with the motor 15. The lever or stem 50 of the valve 24 is directly connected to the control member 25 so that it will have movement in accordance with the movement of the control member. For this connection, we have shown a ball 98 on the outer end of the lever 50 which, as shown in Fig. 4, makes sliding engagement with the sleeve 99 carried in the forward end of the rifle stock 25. Accordingly, any movement of the rifle stock 25 around its pivotal support 26 will produce a movement of the lever 50 to move the closure member 44. When the rifle stock 25 and the lever 50 are in centralized position, as shown in Fig. 1, the service ports 46, 46a, 47, and 47a will be closed by the member 44, and there will be no flow of pressure fluid from the chamber 36 of the valve through any of the conduits 94, 95, 96, or 97 to the fluid operated motors 15 and 18. Should it now be desired to produce an upward vertical movement of the muzzle of the gun 10, the rifle stock 25 may be swung upward, causing the rectangular closure member 44 of the valve to swing downward toward or into the position thereof shown in Figs. 6 and 7, connecting the service port 46 with the chamber 36 and connecting the service port 46a through the opening 49 with the return passage 45. Accordingly, pressure fluid will flow from the chamber 36 out through the conduit 94 to the fluid operated motor 18, and then back through the conduit 95, the port 46a and the opening 49 to the return passage 45 which is connected to the return conduit 92, with the result that the motor 18 will be driven in a direction to rotate the gun support 13 in clockwise direction, thereby elevating the muzzle of the gun 10. A downward displacement of the front end of the rifle stock 25 will raise the closure member 44 so as to reverse the connection of the ports 46 and 46a with the pressure fluid supply and the return line, so that the pressure fluid will flow out through the port 46a, and the conduit 95, to the motor 18, and will be returned to the valve 24 through the conduit 94, thereby causing a reverse operation of the motor 18 which will result in lowering the muzzle of the gun 10.

A further feature of the invention is that as the gun, after a deflection of the rifle stock 25, approaches the position wherein it is aimed at the target toward which the gun stock is pointed, the valve closure member 44 will be gradually moved toward neutral position, and will reach neutral position when the axis of the gun bore is parallel to the lever 50 of the closure member 44. It will be perceived that the valve closure 44 is automatically returned to neutral position by the aiming movement of the gun.

Lateral swinging of the gun 10 results from operation of the motor 15 in either direction so as to swing the yoke 11 in the bearings 12, the feeding of hydraulic fluid to this motor 15 being accomplished by lateral displacement of the forward end of the rifle stock 25 so as to swing the valve lever 50 to one side or the other in accordance with the direction of lateral movement desired for the gun. Fig. 8 shows the rectangular closure member 44 rightwardly offset from centralized position to connect the service ports 47 and 47a respectively with the chamber 36 and the return passage 45, whereby leftward swinging of the gun is accomplished. Diagonal movement of the gun is accomplished by a simultaneous opening of a pair of service ports to receive pressure fluid from the chamber 36, this being accomplished by a diagonal movement of the closure member 44 resulting from a diagonal movement of the front end of the rifle stock 25. For example, if upward and diagonal movement of the gun muzzle is desired, a like movement of the front end of the rifle stock 25 will cause a movement of the closure member 44 to connect ports of 46 and 47a with the chamber 36 and ports 46a and 47 with the return passage 45, as shown in Fig. 9.

In our present device we have provided a gun pointing system wherein a movement of the control member toward a diagonally offset target, or so as to follow the movement of a diagonally moving target, will result in a like movement of the gun muzzle, this being due to the fact that the fluid velocities and therefore the motor velocities are maintained proportional to the displacement of the control member 25 and the closure member 44 from their centralized positions. As an example of the characteristics of this control, Fig. 11 is referred to wherein the point 110 represents the center of the field at which the gun is initially pointed. If the target is moving upward along the diagonal line 111, or is at a point 112 along this diagonal line 111, movement of the gun muzzle to follow the line 111 requires that the lateral velocity of movement and the vertical velocity movement of the gun shall be proportionate to the base 113 and the altitude 114 of the right triangle having the line 111 to represent its hypotenuse and likewise to represent the direction and velocity of the apparent movement of the gun resulting from its lateral and vertical component movements. The condition illustrated in Fig. 11 requires that the operation of the motor 18 to provide the vertical component of the movement shall be at substantially twice the velocity of the motor 15 which produces the lateral component.

To maintain the condition set forth in the preceding paragraph it is necessary that the velocities of the flows of hydraulic fluid through the conduits connecting with the motors 15 and 18 shall be directly proportionate, between zero and maximum values, to the movement of the closure member 44 to connect the service ports 46, 46a, 47, and 47a to the chamber 36 of the valve. We accomplish this effect in two ways, either by forming the ports 46, 46a, 47, and 47a so as to compensate for pressure drop due to the friction resulting from the movement of fluid through the conduits, or by connecting an automatic pressure drop or friction head compensator into the hydraulic system.

In Figs. 1, 7, 8, and 9, we show the service ports 46, 46a, 47, and 47a formed with cross-sectional areas which increase in width from the outer extremities thereof toward the inner extremities, so that the rate of increase in the opening port area will be greater than rate of displacement of the lip of the valve member 44, this increase in effective port area being such that it will compensate for friction head pressure drop and thereby maintain in the conduits leading to the motors fluid velocities which are proportionate to the displacement of the closure member 44.

As an alternative to the foregoing for use in circumstances under which the pressure drop influence is of minor importance, we show in Fig. 10 a ported body 141 which is the same as the ported body 41 previously described, with the exception that it has arranged around the return passage 45 service ports 146, 146a, 147, and 147a which are rectangular in cross-sectional area so that the open port area will vary in direct proportion to the displacement of the closure member 44.

We claim as our invention:

1. In a directionally adjustable device of the character described, the combination of: a directable member mounted so as to have movement in at least two crossing planes; a first motivating means for moving said member in one of said planes; a second motivating means for moving said member in the other of said planes; a control member pivotally connected to said directable member so as to move therewith, said control member being swingable on its pivotal connection to said directable member from a neutral directional relation with said directable member in the direction in which it is desired to move said directable member; and means operating in response to movement of said control member from its neutral directional relation with said directable member to actuate said motivating means in such cooperative relation as to cause movement of said directable member in the same direction as said control member has been moved from its neutral directional relation with said directable member to restore said neutral directional relation of said control member with said directable member.

2. In a device of the character described, the combination of: an adjustable member mounted so as to be movable in any direction from a central position and thereby pointed at an objective; a fluid actuated motor to move said member in one of its directions of movement; a second fluid actuated motor to move said member in another of its directions of movement; a control member supported so that it may be moved in any direction from a neutral directional position relative to said adjustable member and thereby pointed at said objective; and means operative in response to movement of said control member from its neutral position to feed fluid under pressure to said motors in such relative velocities as to drive said motors at such speeds that the resultant movement of said adjustable member will correspond to the direction of movement of said control member from said neutral position thereof to restore said neutral position of said control member relative to said adjustable member whereby said adjustable member will be pointed at said objective.

3. In a device of the character described, the combination of: an adjustable member mounted so as to be movable in any direction from a central position and thereby pointed at an objective; a fluid actuated motor to move said member in one of its directions of movement; a second fluid actuated motor to move said member in another of its directions of movement; a control member supported so that it may be moved relatively to said adjustable member from a neutral directional position in the direction in which it is desired to have said adjustable member move; a valve member mounted on said adjustable member so as to move therewith, said valve member comprising a closure member movable in a body in different directions from a neutral position, said body having inlet port means and service port means for connection respectively to said motors, said service port means being arranged so that they will be closed by said closure member when it is in said neutral position and so that they will be respectively opened when said closure member is moved in at least two different directions from said neutral position thereof to feed fluid to said motors and produce actuation thereof which will move said adjustable member so as to restore said control member to said neutral directional position; means connecting said control member to said closure member whereby movement of said control member from its neutral position will move said closure member from its neutral position; duct means connecting said service port means respectively to said motor; and means for connecting said inlet port means to a source of fluid under pressure.

4. In a device of the character described, the combination of: an adjustable member mounted so as to be movable in any direction from a central position and thereby pointed at an objective; a fluid actuated motor to move said member in one of its directions of movement; a second fluid actuated motor to move said member in another of its directions of movement; a control member supported on said adjustable member so that it may be moved directionally relatively thereto from a neutral directional position in the direction in which it is desired to have said adjustable member move; a valve member comprising a body mounted on said adjustable member, said body having a chamber therein, a closure member supported so as to swing relative to a pivot point in any direction from a neutral position, said closure member having a spheroidal face generated around said pivot point, a ported wall having a spheroidal face in sliding engagement with said face of said closure member with service ports therein arranged peripherally relative to said closure member so as to be closed thereby when said closure member is in said neutral position and so as to be opened to engagement with said chamber when said closure member is swung from said neutral position thereof to feed fluid to said motors and produce actuation thereof which will move said adjustable member so as to restore said control member to said neutral directional position; means to connect said closure member to said control member whereby movement of said control member from its neutral position will move said closure member from its neutral position; duct means connecting said service ports to said motors; and means for connecting said chamber of said valve body with a source of fluid under pressure.

5. In a device of the character described, the combination of: an adjustable member mounted so as to be movable in any direction from a central position whereby it may be pointed at an objective; a reversible fluid actuated motor to move said member in one of its directions of movement; a second reversible fluid actuated motor to move said member in another of its directions of movement; a control member supported on said adjustable member so that it may be moved directionally relatively thereto from a neutral directional position in the direction in which it is desired to have said adjustable member move; valve means comprising a body connected to said adjustable member and having a chamber formed in part by a wall having a spheroidal face, a passage connecting with an intermediate point in said face and pairs of service ports connecting with said face in spaced arrangement around said passage, said pairs of said service ports being disposed on lines which lie in crossing relation, a closure member in sliding engagement with said spheroidal wall and being movable in any direction from a neutral position, said closure member having in the face thereof confronting said wall a cavity defined by a circumscribing wall formed so as to close said service ports when said closure member is in its neutral position, and so as to connect said service ports to said chamber and through said cavity with passage when said closure member is moved from said neutral position; means for connecting said closure member to said control member so that movement of said control member will move said closure member; pairs of conduit means connecting said pairs of service ports respectively to said motors; duct means for connecting said chamber to a source of fluid under pressure; and a return duct member connected to said passage.

6. In a device of the character described: a directable member mounted for universal movement from a neutral position; hydraulic motors to move said directable member in a plurality of directions whereby it may be moved to selected positions within its range of movement; a source of hydraulic fluid pressure; a valve body comprising a wall secured to said directable member having a plurality of service ports arranged around the periphery of a limited area; a closure member in sliding engagement with said wall and being of such size as to cover all of said service ports when said closure member is in a neutral position; means movable relative to said directable member to accomplish sliding movement of said closure member across the face of said wall in any direction from said neutral position thereof whereby one or more of said service ports will be uncovered in accordance with the direction in which said closure member is moved from said neutral position; means to connect said valve body to a source of fluid pressure; and ducts connecting said service ports to said hydraulic motors.

7. In a device of the character described: a directable member mounted for universal movement from a neutral position; hydraulic motors to move said directable member in a plurality of directions whereby it may be moved to selected positions within its range of movement; a source of hydraulic fluid under pressure; a pair of walls in face to face sliding engagement and having relative sliding movement in all directions from a neutral position, one of said walls being mounted on said directable member, one of said walls being a ported wall, and the other of said walls comprising a closure having a peripheral lip defining a cavity confronting said ported wall, said cavity having communication with said source of hydraulic pressure, said closure member when in said neutral position defining a limited area on the face of said ported wall, and said ported wall having a plurality of service ports arranged around said area near the periphery thereof and being in such position that they will all be closed by said peripheral lip of said closure member when in said neutral position; means operatively connecting said service ports to said hydraulic motors; means cooperating with said ported wall to form a chamber to enclose said closure member; and means operative to produce said relative sliding movement of said ported wall and said closure member whereby one or more of said service ports will be opened to said chamber and another one or more of said service ports will be opened to said cavity, depending upon the direction of said relative sliding movement.

8. In a device of the character described: a directable member mounted for universal movement from a neutral position; hydraulic motors to move said directable member in a plurality of directions whereby it may be moved to selected positions within its range of movement; a source of hydraulic fluid under pressure; a hollow valve body mounted on said directable member and having spaced walls forming a space connected to said source of hydraulic pressure, one of said walls having an internal concave spheroidal face and the other of said walls having an opening therethrough, said first wall having a plurality of service ports arranged in an area, said service ports being connected to said hydraulic motors; a swingable member extending through said opening and having a closure member on the inner end thereof for sliding engagement with said concave spheroidal face, for closing and unclosing said service ports; means to connect said valve body to a source of fluid pressure; ducts connecting said service ports to said hydraulic motors; and means supporting said swingable member so that it will pivot substantially on the center point around which said spheroidal face is generated and swing relative to said directable member within a range of movement which moves with said directable member.

9. In a device of the character described: a directable member mounted for universal movement from a neutral position; hydraulic motors to move said directable member in a plurality of directions whereby it may be moved to selected positions within its range of movement; a source of hydraulic fluid under pressure; a hollow valve body mounted on said directable member and having spaced walls, one of said walls having an interior concave spheroidal face with service ports therein for operative connection to said hydraulic motors, and the other of said walls having an opening opposite said face; a swingable member extending through said opening into said body, having on the inner portion thereof a closure member having a polygonal lip for sliding engagement with said face, said lip closing said ports when said closure member is in neutral position; a universal joint supporting said swingable member so that it will swing substantially on the point around which said spheroidal face is generated and swing relative to said directable member within a range of movement which moves with said directable member; means forming a seal between said swingable member and said opening; means to connect said valve body to a source of fluid pressure; ducts connecting said service ports to said hydraulic motors; and means applying a force to said swingable member tending to move the same away from said spheroidal face.

10. In a gunnery device of the character described, the combination of: a gun mounted so as to have aiming movement in at least two crossing planes; a first motivating means for moving said gun parallel to one of said planes; a second motivating means for moving said gun parallel to the other of said planes; a control member pivotally mounted on said gun so as to move therewith, said control member being directionally swingable on said pivotal connection with said gun from a neutral position relative to said gun in the direction in which it is desired to move said gun; and means operating in response to displacement of said control member from said neutral position to actuate said motivating means in cooperative relation as determined by the direction of movement of said control member, to move said gun in a direction which will reestablish neutral relation of said control member with said gun.

11. In a gunnery device of the character described, the combination of: a gun mounted so as to have aiming movement in at least two crossing planes; a first fluid motor for moving said gun parallel to one of said planes; a second fluid motor for moving said gun parallel to the other of said planes; a control member pivotally mounted on said gun so as to move therewith, said control member being swingable on said pivotal connection with said gun from a neutral position relative to said gun in the direction in which it is desired to move said gun; and a four-way valve connected to said control member and operating in response to displacement of said control member from said neutral position to feed fluid to said motors in cooperative relation as determined by the direction of movement of said control member, to move said gun in a direction which will reestablish neutral relation of said control member with said gun.

12. In a gunnery device of the character described, the combination of: a gun mounted so as to have aiming movement in at least two crossing planes; a first motivating means for moving said gun parallel to one of said planes; a second motivating means for moving said gun parallel to the other of said planes; a control device mounted on said gun so as to move therewith, said control device comprising a control member manually directionally movable relative to said gun from a neutral directional position relative to said gun in a direction corresponding to that in which it is desired to move said gun; and means operating in response to displacement of said control member from said neutral position to actuate said motivating means in cooperative relation as determined by the direction of movement of said control member, to move said gun in a direction which will reestablish said neutral directional relation of said control member with said gun.

13. In a directionally adjustable device of the character described, the combination of: a directable member mounted so as to be universally directionally adjustable relative to its mount; a motivating means for moving said member to adjust its direction universally with respect to said mount; a control member mounted on said directable member so as to be universally directionally displaceable relative to said directable member; and control means operating in response to displacement of said control member from a directionally neutral position relative to said directable member to actuate said motivating means only for the duration of said displacement and in such correlation to said displacement as to cause movement of said directable member to vary its directional relationship to said mount in the same direction as the variation in the directional relationship of said control member to said mount consequent from said displacement of said control member, whereby said movement of said directable member, when said displaced control member is held stationary relative to said mount is in a direction to diminish said displacement.

14. In a gunnery device of the character described, the combination of: a gun mounted so as to have aiming movement in at least two crossing planes; a first motivating means for moving said gun parallel to one of said planes; a second motivating means for moving said gun parallel to the other of said planes; an aiming control means for said gun comprising a gunstock constructed so as to be aimed at a gun target mounted so as to be movable from a neutral position in which it has a constant directional relation to said gun in any of the directions in which it may be desired to move said gun; and means operating in response to displacement of said gunstock from said neutral position to actuate said motivating means in cooperative relation as determined by the direction of said movement of said gunstock, from said neutral position to move said gun in a direction which will reestablish said neutral position of said gunstock.

15. In a gunnery device, the combination of: a gun mount, a gun universally directionally mounted thereon, motivating means for moving said gun in any direction on said mount, a control member universally directionally mounted on said gun for movement with and with respect to said gun and having a normal neutral position with respect thereto, and actuating means operated by relative movement between said gun and said control member adapted to actuate said motivating means in response to said relative movement.

16. The combination defined in claim 15 in which said actuating means is mounted on the gun.

17. The combination defined in claim 15 in which said motivating means is fluid pressure operated and said actuating means is a valve means for said motivating means and is mounted on the gun.

HAROLD W. ADAMS.
ORVILLE A. WHEELON.